(12) United States Patent
Miller et al.

(10) Patent No.: US 7,510,677 B2
(45) Date of Patent: *Mar. 31, 2009

(54) APPARATUS AND METHOD FOR REMOVING A MOLDED ARTICLE FROM A MOLD, AND A MOLDED ARTICLE

(75) Inventors: William E. Miller, Ann Arbor, MI (US); Lingxin Dong, Thornhill (CA); Frank Favot, Bolton (CA); Michael Marshall, Rochester, NY (US); Walter Paegel, Ypsilanti, MI (US); Randy Yakimishyn, Bolton (CA)

(73) Assignee: Husky Injection Molding Systems Ltd. (CA)

( * ) Notice: Subject to any disclaimer, the term of this patent is extended or adjusted under 35 U.S.C. 154(b) by 477 days.

This patent is subject to a terminal disclaimer.

(21) Appl. No.: 11/335,728

(22) Filed: Jan. 20, 2006

(65) Prior Publication Data

US 2006/0119003 A1 Jun. 8, 2006

Related U.S. Application Data

(63) Continuation of application No. 10/350,325, filed on Jan. 24, 2003, now Pat. No. 6,989,124.

(51) Int. Cl.
*B29C 45/44* (2006.01)
(52) U.S. Cl. .................. 264/318; 264/334; 425/556
(58) Field of Classification Search ................ 425/533, 425/556, 557; 264/318, 334, 336, 537
See application file for complete search history.

(56) References Cited

U.S. PATENT DOCUMENTS 3,269,617 A 8/1966 Goth (Continued)

FOREIGN PATENT DOCUMENTS

EP 0 089 047 A1 9/1983

(Continued)

OTHER PUBLICATIONS

R. G. W. PYE, Injection Mould Design, 1983, pp. 104-107, Longman Scientific & Technical, copublished in the U.S. with John Wiley & Sons, in association with The Plastics and Rubber Institute.

(Continued)

*Primary Examiner*—Jill L Heitbrink
(74) *Attorney, Agent, or Firm*—Katten Muchin Rosenman LLP (57) ABSTRACT

Injection molding method and apparatus for ejecting a molded plastic article from a mold. A lifting structure and/or step is provided with a lifting portion which is configured to contact substantially one half of an end of the molded plastic article along a line substantially perpendicular to the lifting direction. Since the molded plastic article is lifted by its end, the article does not have to be solidified at its interior, thus allowing earlier removal of the article from the mold, reducing cycle time. A tapered surface forms an acute angle with respect to the lifting portion to form a tight seal with the mold, preventing leakage. Preferably, the neck ring engages only an outer circumferential portion of the molded plastic article during a majority of a mold opening stroke.

20 Claims, 6 Drawing Sheets

U.S. PATENT DOCUMENTS

| | | | |
|---|---|---|---|
| 4,025,022 A | 5/1977 | Theysohn et al. | |
| 4,125,246 A | 11/1978 | von Holdt | |
| 4,179,254 A | 12/1979 | Brown | |
| 4,201,535 A | 5/1980 | Ninneman | |
| 4,521,177 A | 6/1985 | Blank et al. | |
| 4,575,331 A | 3/1986 | Dundas et al. | |
| 4,603,831 A | 8/1986 | Krishnakumar et al. | |
| 4,615,667 A | 10/1986 | Roy | |
| 4,632,357 A | 12/1986 | von Holdt | |
| 4,648,834 A | 3/1987 | Von Holdt | |
| 5,137,442 A | 8/1992 | Starkey | |
| 5,647,930 A | 7/1997 | Bright | |
| 5,736,173 A | 4/1998 | Wright et al. | |
| 5,762,970 A | 6/1998 | Takashima et al. | |
| 5,833,912 A | 11/1998 | Schweigert et al. | |
| 6,176,700 B1 | 1/2001 | Gellert | |
| 6,220,850 B1 | 4/2001 | Catoen et al. | |
| 6,413,075 B1 | 7/2002 | Koch et al. | |
| 6,604,934 B2 | 8/2003 | Ciccone et al. | |
| 6,989,124 B2 * | 1/2006 | Miller et al. | 264/318 |
| 7,128,865 B2 * | 10/2006 | Martin | 264/318 |

FOREIGN PATENT DOCUMENTS

| | | |
|---|---|---|
| FR | 2 488 547 | 2/1982 |

OTHER PUBLICATIONS

Zygo Drawings (11 Sheets), Jun. and Jul. 1996.

* cited by examiner

APPARATUS AND METHOD FOR REMOVING A MOLDED ARTICLE FROM A MOLD, AND A MOLDED ARTICLE

This application is a continuation of U.S. patent application Ser. No. 10/350,325, filed Jan. 24, 2003 (allowed), the entire contents of which are incorporated herein by reference.

BACKGROUND OF THE INVENTION

1. Field of the Invention

The present invention relates to method and apparatus for injection molding of preforms so that their subsequent reheating and blow-molding into containers is simplified. In particular, the present invention relates to a method and apparatus for providing an improved neck-ring or neck split components of an injection mold that allows for an earlier ejection or removal of the preform from the injection mold, thus reducing time needed to manufacture the preform. The method and apparatus are particularly well suited for thermoplastic polyester polymer materials such as polyethylene terephthalate.

2. Related Art

Well known by those skilled in the art, the preform is a tube with a generally hollow circular cross-sectional configuration having a body portion, a closed end portion with a generally hemispherical configuration, and an open end. About the open end and superimposed between the open end and the body portion is a generally circular neck-finish. Ultimate container needs will dictate specific details of preform size and shape. Although smaller and larger sizes are feasible, technicians make specific preform configurations for specific container configurations with a capacity typically between 250 ml to four liters.

For receiving a closure (i.e., a lid), the neck-finish has a configuration generally having a sealing surface portion adjacent to the open end, a handling ring portion adjacent to the body portion that helps facilitate manufacture of the blow-molded container, and a threaded portion between the sealing surface and handling ring for attachment of the closure. To assure proper closure attachment and seal, the neck-finish requires sufficiently consistent and accurate dimensional characteristics generally free of distortions or deformations. While a screw thread is a common form, the threaded portion can be any form of lugs, snap-rings, or other appendages for attaching the closure, such as, but not limited to, a standard crown neck finish.

Also well known by those skilled in the art is the injection molding process. The process involves injecting a thermoplastic polymer or other plastic material at a molten elevated temperature through a small opening or nozzle into the injection mold. The injection mold is an assembly of various components creating a closed and sealed cavity that allows the molten polymer to form the preform without leakage between components. Once the injected polymer material sufficiently cools and solidifies, selected components of the injection mold separate to allow preform ejection or removal.

In a commonly used process for blow molding the container, an oven of a blow-molding machine heats and softens the polymer material of the body portion of the preform but not the neck-finish. The blow-molding machine, holding the preform by the handling ring portion of its neck-finish, places the heated preform into a blow-mold cavity where pressurized air then inflates and expands to conform the preform to the blow-mold cavity thus forming the container. The neck-finish configuration of the blow-molded container generally remains unchanged and retains the configuration acquired when initially injection molded as the preform.

The time needed to injection-mold the preform is typically limited by the time needed to cool and solidify injected polymer material sufficiently to permit removal of the part from the mold without causing deformation or distortion. Usually, a segment of the preform having a thicker wall cross-sectional dimension determines the cooling time required. The plastic within the thicker wall cross-sectional segment generally requires more time to cool and solidify sufficiently and the neck-finish often has one of the thicker wall cross-sectional segments.

To form the open end and hollow circular cross-sectional configuration of the preform, the injection mold assembly typically uses a core component that is a substantially straight-sided rod with a longitudinal axis. Surrounding and adjacent to the core component is the neck-ring or neck split components. The neck-ring is a pair of semicircular pieces that accurately shape the dimensional characteristics of the neck-finish and assists in removing the preform from the core component.

During preform removal, an apparatus within the injection mold causes the neck-ring components to initially move in unison in a direction parallel to the longitudinal axis of the core rod. The neck-ring components bearing against the threaded portion and handling ring portion of the neck-finish cause the preform to slide in a longitudinal direction from the core component.

Molten thermoplastic polymer material at its elevated temperature will generally shrink as it cools and solidifies. Accordingly, in manufacture, the preform will generally shrink against the core component as the material cools. As the core component restrains the shrinkage, molecular forces develop that cause the preform to grip the core's side. Forces acting on the threaded portion and handling ring portion of the neck-finish during removal must transmit through the wall of the preform to overcome frictional resistance created by the grip of the preform against the core. In other words, the forces applied to the threaded portion and the handling ring portion of the neck-finish is in shear with the resistance of the grip of the preform against the core.

The polymer material does not solidify at the same moment. Generally the material in direct contact with mold surfaces will solidify sooner than material not in direct contact. If the polymer material has not sufficiently solidified throughout the neck-finish wall cross-section, the neck-finish will not have sufficient strength to transmit the force and thus can deform and distort during removal causing the sealing surface portion to become irregular and incapable of maintaining proper seal with the closure. Consequently, molding technicians extend cooling time to assure polymer solidification of the neck-finish thus preventing distortion. For thermoplastic polyester polymer materials, the time typically needed to inject and cool the polymer and remove the preform is about 21 to 26 seconds.

Figure 1:
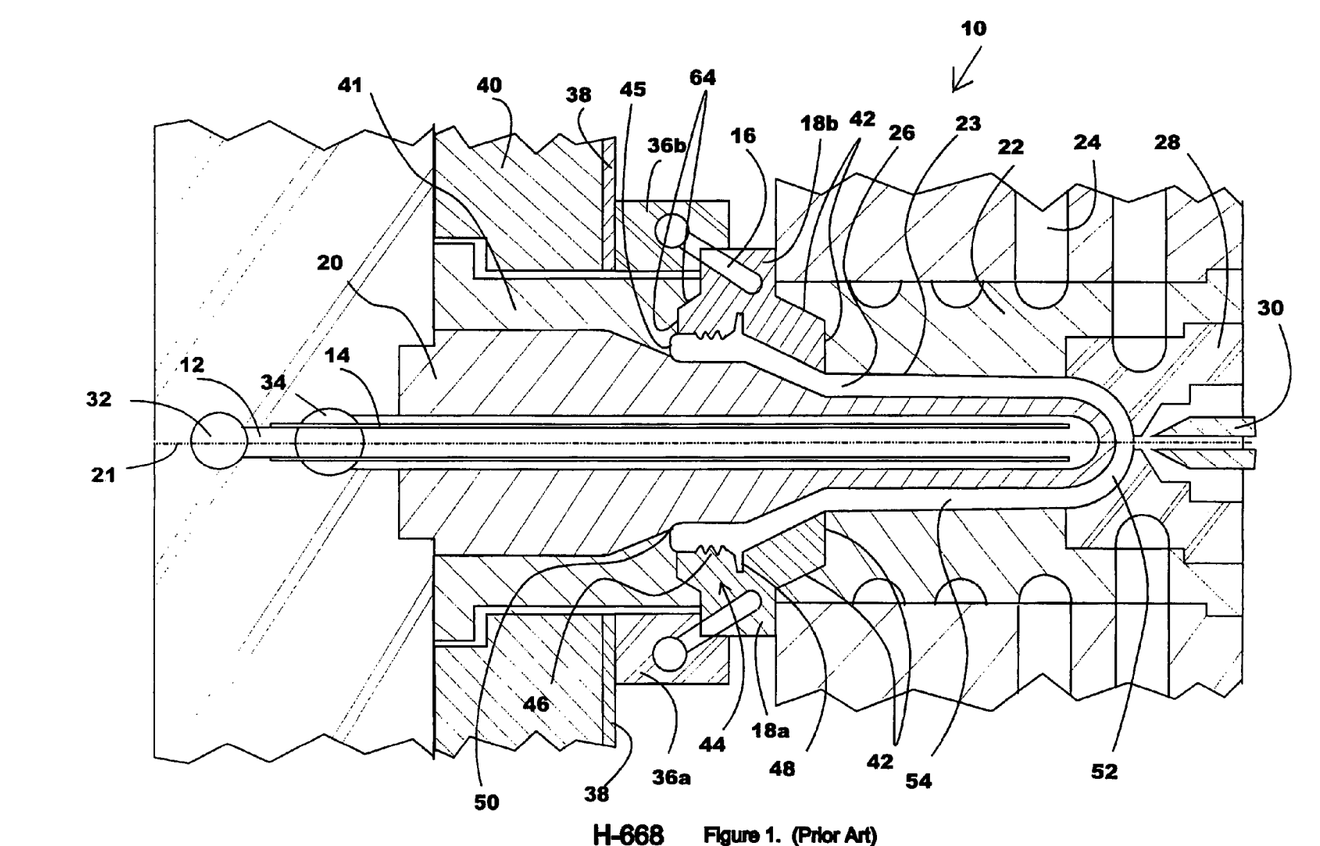
FIG. 1 is a cross-sectional view of a known preform injection mold assembly before ejection of a molded preform having a neck-finish and a sealing surface.

Thus, in most preform designs, the portion limiting the earliest stripping time is the neck finish portion. FIG. 1 is a cross-sectional view of a preform mold assembly 10 having a core cooling channel 12, a core cooling tube 14, a neck-ring cooling channel 16, a neck-ring or neck split components 18*a* and 18*b*, a core component 20 having an axis 21, a mold cavity block 22 with a cavity surface 23, and a mold cooling channel 24 which extends circumferentially around the mold cavity block 22. FIG. 1 also shows a preform 26, a mold gate insert 28, and an injection nozzle 30. The preform mold assembly 10 is an assembly of various components that creates a closed and sealed cavity that allows molten polymer injected into the cavity to form the preform 26 without substantial leakage between components. In FIG. 1, the preform 26 has a configuration that is substantially identical to the closed cavity.

The core-cooling channel 12 includes a cooling inlet 32 and a cooling outlet 34. The neck-ring component 18a and 18b mount to the ejector bar 36a and 36b, and slide respectively on a wear pad 38 by a means of cams and gibs (not shown). The wear pad 38 fastens to a stripper plate 40. A core holder 41 retains the core component 20. The preform 26 has an open end 50, a closed end 52, a body portion 54, and a neck-finish 44. The neck-finish 44 has a sealing surface portion 45, a threaded portion 46, and a handling ring portion 48. The neck-ring components 18a and 18b comprise a pair of semicircular pieces that accurately shape the dimensional characteristics of the neck-finish 44 and assist in removing the preform 26 from the core component 20.

During the preform 26 removal or ejection, the preform mold assembly 10 initially separates along a parting line 42 allowing the core component 20, the core holder 41, the neck-ring components 18a and 18b, the preform 26, and other associated components to move in unison in a direction parallel to the axis 21 and thereby pull the preform 26 free from the mold cavity block 22, the mold gate insert 28, and the nozzle 30, thus separating the preform 26 from the cavity surface 23. Actuation of the stripper plate 40 then causes the ejector bar 36a, 36b and the neck-ring component 18a, 18b to initially move in unison in a direction parallel to the axis 21 to remove the preform 26 from the core component 20. Eventually, the neck-ring component 18a and the ejector bar 36a move moves in a first direction perpendicular to and away from the axis 21 on the wear pad 38 and simultaneously the neck-ring component 18b and the ejector bar 36b move moves in a second and opposite direction (of that taken by the neck-ring component 18a and the ejector bar 36a) perpendicular to and away from the axis 21 on the wear pad 38 setting the preform 26 entirely free from the preform mold assembly 10.

In addition to the distortion problem described above, another problem with known mold designs is where the neck ring halves do not seal against the core when they are closed (assembled), and the mold is then closed and clamped. After the mold has been opened and the part is ejected, the neck ring halves 18a and 18b that are carried forward by the stripper plate 40 are separated from each other. Before the next molding cycle can commence, the ejection mechanism must be reversed to restore the neck rings and stripper plate to their molding positions, shown in FIG. 1. This reversing procedure includes moving the neck rings towards each other until they touch during the backward stroke of the stripper plate so that, by the time the stripper plate has fully returned (in the position shown in FIG. 1), the neck rings are completely closed with their mutual parting surfaces touching. The complete closing of the neck rings can be performed at any point during the stroke of the return of the stripper plate as the neck rings are not in any danger of touching the core at any point.

In designs where the neck rings are going to touch the core in the mold closed position, it is preferable that they themselves are first closed so that when they finally touch the core they do so as an assembled pair. In the case of an earlier Husky design, the neck rings had a "shut-off" cylindrical surface that was parallel to the longitudinal axis of the core and touched the core diameter. However, this design is not optimal since, if there is a gap between these two cylindrical surfaces greater than about 0.005 inch, the risk of plastic leaking through this gap during injection is significant. Consequently, this type of design requires close tolerance manufacture of these surfaces to ensure the assembled gap is less. Unfortunately, molds wear as they are used, and eventually a design like this leaks. Another early Husky design had a tapered, or conical shut-off, surface that contacted a correspondingly mating tapered surface on the core. These two surfaces were pressed together during molding, causing a positive seal that prevents plastic leakage. However, this design was not optimal because the preform still had neck-ring distortions when it was stripped from the core.

Figure 2:
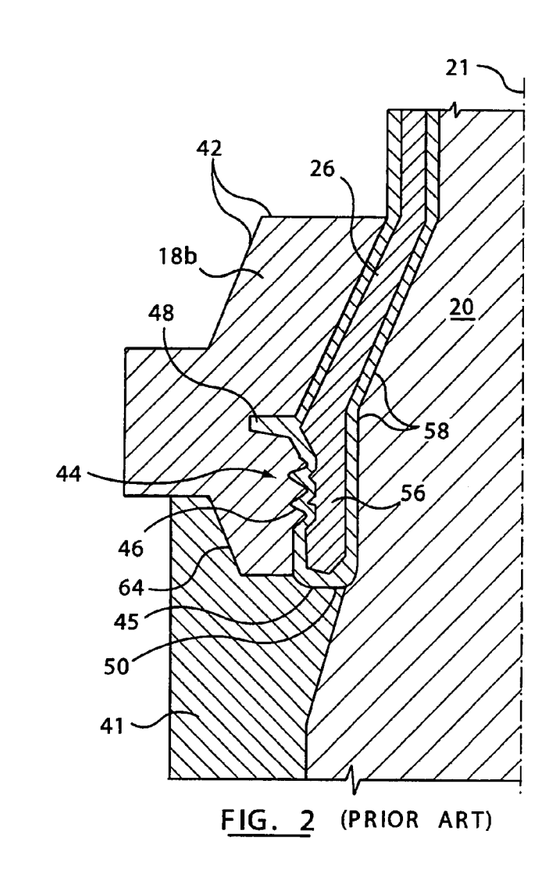
FIG. 2 is a partial cross-sectional view of selected components of the assembly shown in FIG. 1, and the neck-finish portion of the preform before a neck-ring moves to complete preform ejection.

FIG. 2 is a partial cross-sectional view of selected components shown in FIG. 1 and further showing the preform 26 having a wall thickness 56, and the core component 20 having a core surface 58. The mold cavity block 22 (not illustrated in FIG. 2) has separated from the neck-ring 18b along the parting line 42.

Figure 3:
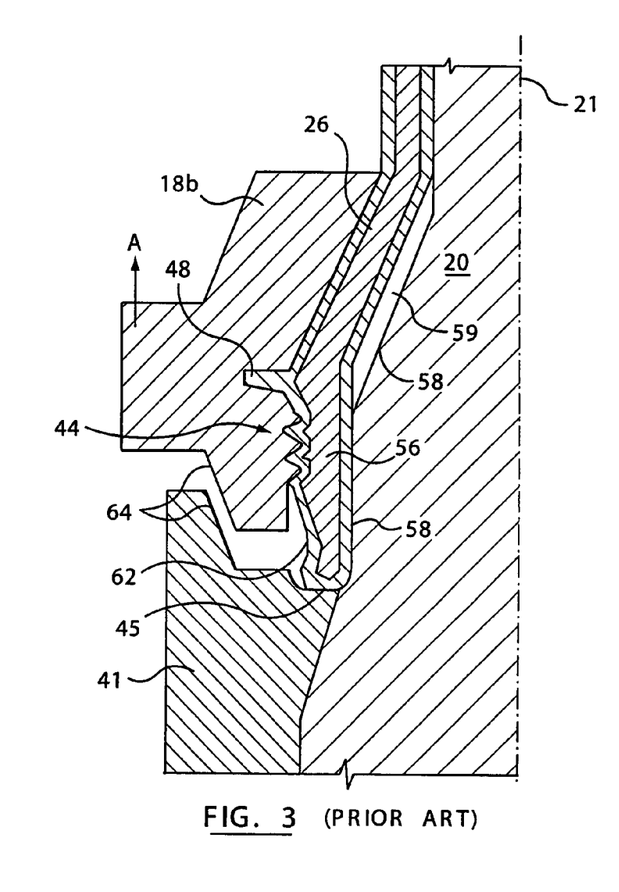
FIG. 3 is a partial cross-sectional view of components shown in FIG. 2 with the preform partially removed and showing a typical neck-finish distortion.

FIG. 3 is a partial cross-sectional view similar to FIG. 2. The neck-ring 18b has initially moved in direction "A" parallel to the axis 21 to begin removal of the preform 26 from the core component 20. The neck-ring 18b (and 18a, not illustrated in FIG. 3) has separated from the core holder 41 along a sub-parting line 64. Furthermore, the preform 26 has partially separated 59 from the core surface 58. The sub-parting line 64 ends at the neck-finish 44 adjacent to and between the sealing surface portion 45 and the threaded portion 46 (see FIG. 2).

Molten thermoplastic polymer material at its elevated temperature will generally shrink as it cools and solidifies. Accordingly, in manufacture, the preform 26 will generally shrink against the core component 20 as the material cools. As the core component 20 restrains the shrinkage, molecular forces develop that cause the preform 26 to grip the core surface 58. Forces acting through neck-ring 18b (and 18a, not illustrated in FIG. 3) and ultimately bearing on the threaded portion 46 and the handling ring portion 48 of the neck-finish 44 during removal must transmit through the wall thickness 56 of the preform 26 to overcome friction created by the grip of the preform 26 against the core surface 58. If the polymer material has not sufficiently solidified throughout the neck-finish wall thickness 56, it will not have sufficient strength to allow transfer of forces to overcome friction of preform sticking around the core component 20 at about a point 60 of the core surface 58. This in turn will cause neck-finish distortion 62 as the neck-ring 18b (and 18a, not illustrated in FIG. 3) move in direction "A." The distortion 62 causes the sealing surface 45 to become irregular (not illustrated) thus a closure (not illustrated) subsequently attached to the neck-finish 44 will not properly seal.

To assure that the polymer within the wall thickness 56 is sufficiently solid and rigid to transmit forces applied by the neck-ring 18a and 18b, without neck-finish distortion occurring during removal, molding technicians may extend the time to manufacture the preform 26. Typical molding time needed for manufacturing the preform 26 of thermoplastic polyester materials is about 21 to 26 seconds. An attempt to alleviate this problem was made in another early Husky design wherein a small portion of the neck ring (less than fifty percent) was made to contact an outer circumferential portion of the top sealing surface of the preform. However, this design suffered from two disadvantages. First the small area of contact between the neck ring and the top sealing surface still required substantial cooling time to prevent neck ring distortions. Second, this design had the cylindrical neck ring mating surfaces which allowed for leakage of the molten plastic.

U.S. Pat. Nos. 4,521,177; 6,176,700; 6,220,850 and 6,413,075 show insert assembly arrangements for molding preforms. U.S. Pat. Nos. 4,025,022; 4,125,246; 4,179,254;

4,632,357; 4,648,834; and 5,137,442 show other injection molding machines utilizing various stripping devices.

Therefore, there is a need for a neck finish portion cooling method and apparatus, which provides rapid, efficient neck cooling while further reducing the molding cycle time to further decrease the cost of producing molded plastic preforms.

SUMMARY OF THE INVENTION

It is an object of the present invention to provide cooling method and apparatus for efficiently cooling molded plastic preforms.

According to a first aspect of the present invention, structure and/or steps are provided for ejecting a molded plastic preform from a molding structure. Lifting structure is provided with: (i) a first portion configured to contact the molded plastic preform along a line substantially parallel to a lifting direction; (ii) a second portion configured to contact an end of the molded plastic preform along a line substantially perpendicular to the lifting direction. Since the preform is lifted by its end, the preform does not have to be solidified at its interior, thus reducing cycle time; and (iii) a third portion disposed on an opposite side of the second portion from the first portion, the third portion having a tapered surface having an angle of less than ninety degrees with respect to the second portion.

According to a second aspect of the present invention, structure and/or steps are provided for ejecting a molded preform from a mold device. A lifting portion is disposed to contact substantially one half of an end of the molded preform and applies a compressive force thereto. A neck ring sealing portion is provided and has a tapered surface disposed below the neck ring lifting portion, the tapered surface being disposed at an angle of less than ninety degrees with respect to the neck ring lifting portion. A movement device is disposed to cause relative movement between the lifting portion and the mold device to eject the molded preform from the mold device.

According to a third aspect of the present invention, structure and/or steps are provided for an injection molding machine having a mold cavity configured to receive a molten material and form it into a molded preform, and a mold core configured to engage the molded preform. Ejecting structure is provided to eject the molded preform from the mold core by applying a compressive force to an end of the molded preform. The said neck ring structure is configured to contact at least one half of an outer circumferential portion of a neck portion of the molded preform throughout a majority of an opening stroke. The neck ring ejecting structure has (i) a lifting surface substantially perpendicular to a lifting direction, and (ii) a tapered sealing surface disposed at an acute angle with respect to the lifting surface.

According to a fourth aspect of the present invention, structure and/or steps are provided for an apparatus for removing a preform from an injection mold wherein the preform has a neck-finish including a handling ring portion, a threaded portion, and a sealing surface portion. The apparatus includes a neck-ring that bears against (i) a segment of said handling ring portion, (ii) a segment of said threaded portion, (iii) substantially one half of said sealing surface portion during said removal of said preform from said injection mold, and (iv) a tapered portion of a mold core component that holds the preform.

According to a fifth aspect of the present invention, structure and/or steps are provided for an apparatus for removing a preform from a core component of an injection mold, wherein the preform has a neck-finish including a handling ring portion, a threaded portion, and a sealing surface portion. The apparatus has a neck-ring that forms the neck-finish including a segment of the handling ring portion, the threaded portion, and a first segment of the sealing surface portion during a process for injection molding the preform in the injection mold before the neck-rings against said handling ring portion, said threaded portion, and said first segment of said sealing surface portion to remove said preform from said core component. The first segment contacts substantially one half of the sealing surface portion and is disposed at an acute angle with respect to a tapered segment disposed below the first segment.

According to a sixth aspect of the present invention, structure and/or steps are provided for an apparatus for removing a thermoplastic preform from a core component of an injection mold wherein the preform has a thermoplastic neck-finish comprising a handling ring portion, a threaded portion, and a sealing surface portion. The apparatus includes a neck-ring that forms the thermoplastic neck-finish including a segment of the handling ring portion, the threaded portion, and a first segment of the sealing surface portion. The core component forms a second segment of the sealing surface portion during a process for injection molding the thermoplastic preform of a thermoplastic polymer in the injection mold. The thermoplastic preform grips the core component as the neck-ring bears against the segment of the handling ring portion, the threaded portion, and the first segment of the sealing surface portion to overcome a frictional force associated with the grip of the thermoplastic preform by placing the thermoplastic polymer within the thermoplastic neck-finish temporarily in compression as the neck-ring removes said thermoplastic preform from the core component. The first segment contacts substantially one half of the sealing surface portion and is disposed at an angle of less than ninety degrees with respect to a tapered surface disposed below the first segment.

BRIEF DESCRIPTION OF THE DRAWINGS

The advantageous structure and/or function according to the present invention will be more easily understood from the following detailed description of the preferred embodiments and the appended Drawings, as follows.

DETAILED DESCRIPTION OF THE PRESENTLY PREFERRED EXEMPLARY EMBODIMENTS

1. Introduction

The present invention will now be described with respect to several embodiments in which a neck ring applies a compressive force to the open, circular end of an injection-molded plastic preform before the preform is completely solidified, thus reducing cycle time, and in which conical neck ring mating surfaces are used to prevent leakage. However, the present invention will find applicability in many molding technologies beyond injected-molded plastic preforms, such as the molding of containers, pails, trays, paint cans, tote boxes, and similar products, or other molded products possibly with non-circular cross-sectional shapes, etc.

In brief, the preferred embodiments of the present invention will redistribute the forces acting on the neck-finish during preform removal. By reconfiguring the neck-ring or neck split components to bear against not only the handling ring portion and the threaded portion, but also the sealing surface portion, the preferred embodiments are able to distribute forces over a larger area, thus reducing risk of neck-finish deformation and distortion during preform removal. The force now bearing against the sealing surface portion places some of the polymer within the neck-finish in compression. Furthermore, being in direct contact with mold components, the material that will be in compression is more likely to have solidified first, thus it is better equipped to overcome the resistance created by the grip of the preform against the core component. Accordingly, the reconfigured neck-ring components permit preform removal before polymer solidification throughout is complete. In trials, up to a five second reduction in preform manufacturing time has been achieved, without risk of neck-finish distortions.

In general, the preferred embodiments utilize an apparatus for removing a preform from an injection mold wherein the preform has a neck-finish comprising a handling ring portion, a threaded portion, and a sealing surface portion. The apparatus comprises a neck-ring that bears against a segment of said handling ring portion, a segment of said threaded portion, and a substantial segment of the sealing surface portion during the removal of the preform from the injection mold. The neck-ring removes said preform from a core component of the injection mold. The neck-ring forms the neck-finish including a segment of the handling ring portion, the threaded portion, and a first segment of the sealing surface portion during a process for injection molding the preform in the injection mold before the preform removal by the neck-ring. The core component forms a second segment of the sealing surface portion while the neck-ring forms the first segment. The neck ring also includes a conical, tapered portion to contact the core surface and tightly seal the neck ring halves together.

The sealing surface portion of the preform includes a circumjacent step formed by the neck-ring establishing the first segment as a subordinate sealing surface portion formed by the neck-ring and the second segment as a dominant sealing surface portion formed by the core component. The dominant sealing surface portion formed by the core component and the subordinate sealing surface portion formed by the neck-ring according to a preferred embodiment have a difference in elevation of about 0.001 to 0.005 inch (0.025 to 0.125 mm). The neck-ring removes a preform made of thermoplastic polymer such as thermoplastic polyester.

2. The Structure

Figure 4:
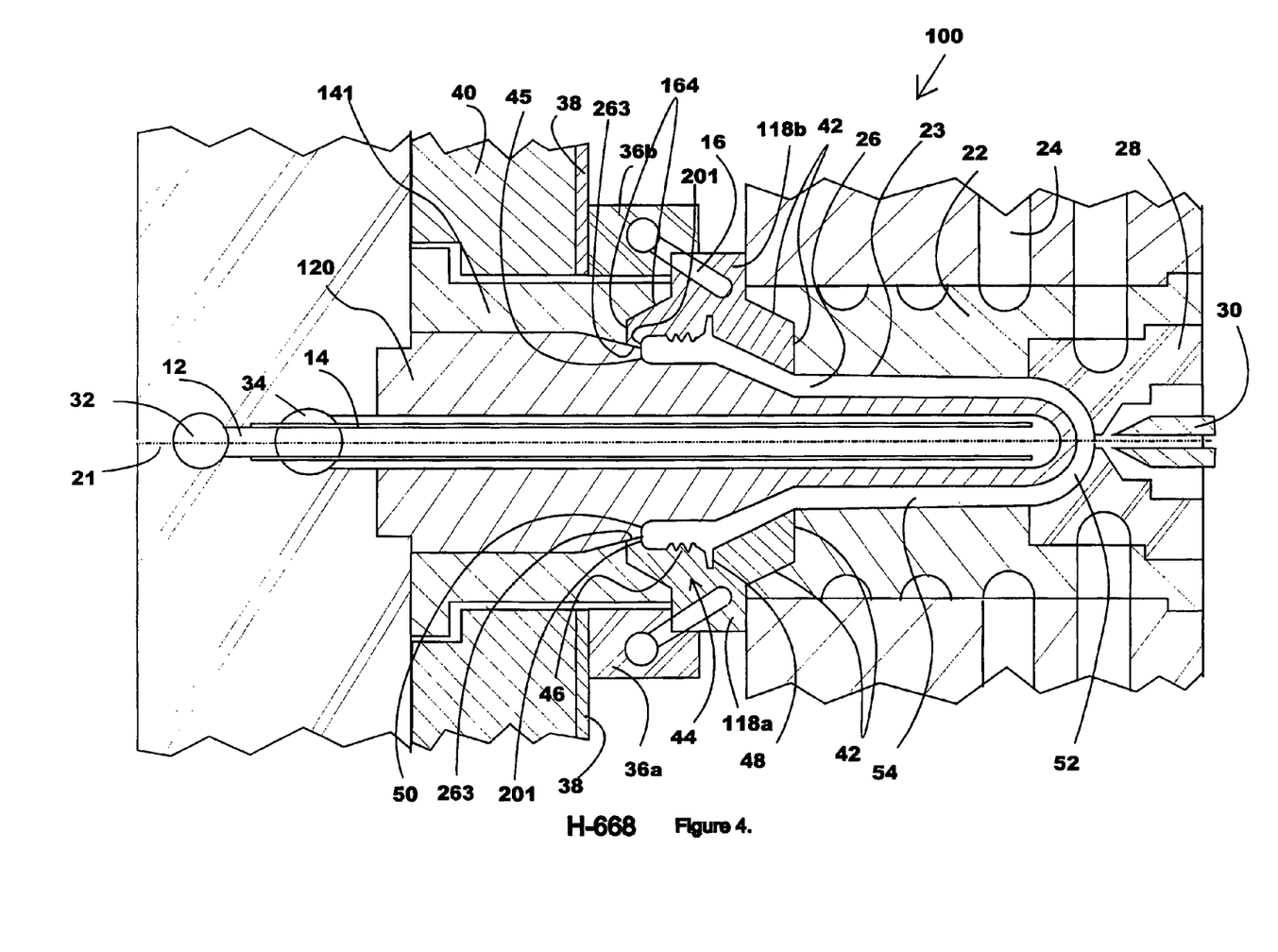
FIG. 4 is a cross-sectional view of a preform injection mold assembly according to a preferred embodiment of the present invention before ejection of the molded preform.

FIG. 4 is a cross-sectional view of a preform mold assembly 100 of a preferred embodiment of the invention before ejection of the molded preform 26. The assembly 100 has a neck-ring or neck split components 118a and 118b, a core component 120 having the axis 21, and a core holder 141. The neck-ring components 118a and 118b, core holder 141, and core component 120 form a sub-parting line 164 with an ending point, ending in a circumjacent fashion on the sealing surface portion 45 of preform 26. Other components of the reconfigured preform mold assembly 100 are similar to those discussed above with respect to preform mold assembly 10.

FIG. 4 shows two notable features according to the present invention. First, a lifting portion 201 contacts substantially fifty percent of the outer circumferential portion of the top sealing surface to lift the preform from the core after the outer skin is somewhat solidified, to reduce neck ring distortion. Second, the neck ring halves 118a, 118b each have a tapered, conical surface 263 disposed below and forming an acute angle with respect to the lifting portion 201, to tightly engage the outer surface of the core and prevent leakage.

FIG. 4 shows that the external tapers 263 on the neck rings 118a, 118b at parting lines 164 and 42 cause the neck rings to remain closed and pressed together while the mold is closed and subjected to clamping force. This same action ensures the tapered sealing surfaces of the neck ring assembly remain pressed against the core's matching tapered surface 164 in FIG. 5.

The preform mold assembly 100 follows a similar sequence of operation as the preform mold assembly 10. That is, molten plastic is injected into the mold cavity via the injection nozzle 30 through the gate insert 28. The cooling channels of the injection mold 100 and the cooling channel of the core 120 cool the molten plastic and form preform 26 in the injection mold 100.

Figure 5:
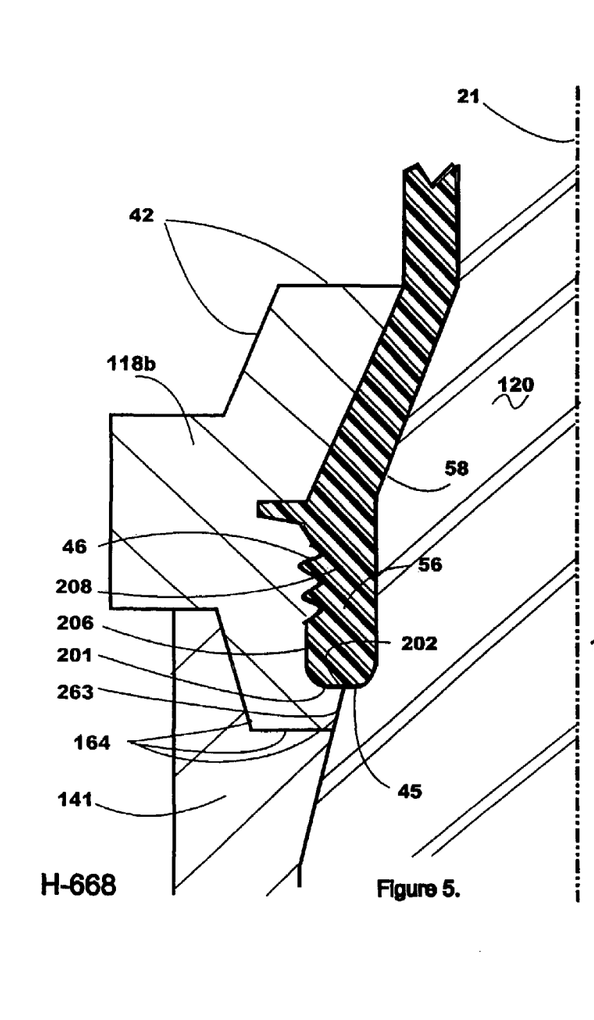
FIG. 5 is a partial cross-sectional view of selected components of the assembly shown in FIG. 4 and the neck-finish portion of the preform before a reconfigured neck-ring moves to complete preform ejection and further showing a core-lock neck-ring configuration.

FIGS. 5-9 show, in greater detail, the improved neck ring designs that allow the ejecting action of the preform to occur earlier than otherwise would have been possible for a given preform design. With reference to FIG. 5, the neck ring 118b has been extended in length (height) so that its molding surface includes a lifting portion 201 which engages and lifts a corresponding circular top sealing surface (an engagement portion) of the preform's top surface (at the preform's open end), when the neck ring is moved in the ejecting direction of arrow AA. As shown, the lifting portion 201 contacts substantially on half, but less than all of the top sealing surface of the preform's top surface. Of course, the design may be modified so that the lifting portion 201 contacts the entire top sealing surface.

The flat lifting portion 201 as part of the molding surface of the neck rings in the current invention is used to allow the part to be ejected earlier in the molding cycle than it would have been in earlier designs. As explained above, the injection resin cools from the outside inwards by virtue of its contact with the cooled molding surfaces. Consequently, the portion of the top sealing surface being formed by the neck rings will cool similarly—from the outer surface inwardly. The formation of a solid skin that can resist ejection forces without deforming determines when the ejection process can start. By including the flat portion 201 on the neck ring, the solidified portion of the preform can be acted on by the neck ring when ejecting the part. The ejection force acts along a line parallel to the centerline of the core, that is perpendicularly to the surface of the flat lifting portion 201. This is an optimal condition. In earlier designs that did not have this extended flat portion, any ejection motion from the neck ring begins acting on the corner radius of the top sealing surface. Applying the force to this radial surface induces vectors trying to push the part inwardly, possibly causing the part's neck finish diameter to be reduced thereby risking the part not being molded within its dimensional specification. Consequently the early ejection benefit is much more risky and consequently unlikely to be realized with such a design.

The neck ring halves 118*a*, 118*b* also have tapered surfaces 263 that form a conical sealing surface for the outer surface of the core when the neck rings are closed and the core is inserted into the mold. These tapered surfaces form an acute angle of less than 90 degrees with respect to the lifting portion 201. The combination of the tapered surfaces 263 and the substantial lifting portion 201 provides a neck ring design which allows for early preform ejection with minimal leakage. The fact that the sharp angle between the tapered surface 263 and the lifting portion 201 is placed near the center (or inside) of the top sealing surface 45 prevents leakage through part line 164 while providing a straight compressive lifting force to the already-solidified skin portion of the top sealing surface.

The neck ring also has a cylindrical surface 206, which contacts contact the preform along a line substantially parallel to the lifting direction. Further, the neck ring also has a threaded portion 208, which contacts the threaded portion of the preform. FIG. 5 also shows the preform 26 having wall thickness 56 and core component 120 having core surface 58. Mold cavity block 22 (not illustrated in FIG. 5) has separated from neck-ring 118*b* along parting line 42. As shown, the lifting portion 201 is configured so as to not contact an inner circumferential portion of the molded plastic preform's top surface.

Figure 6:
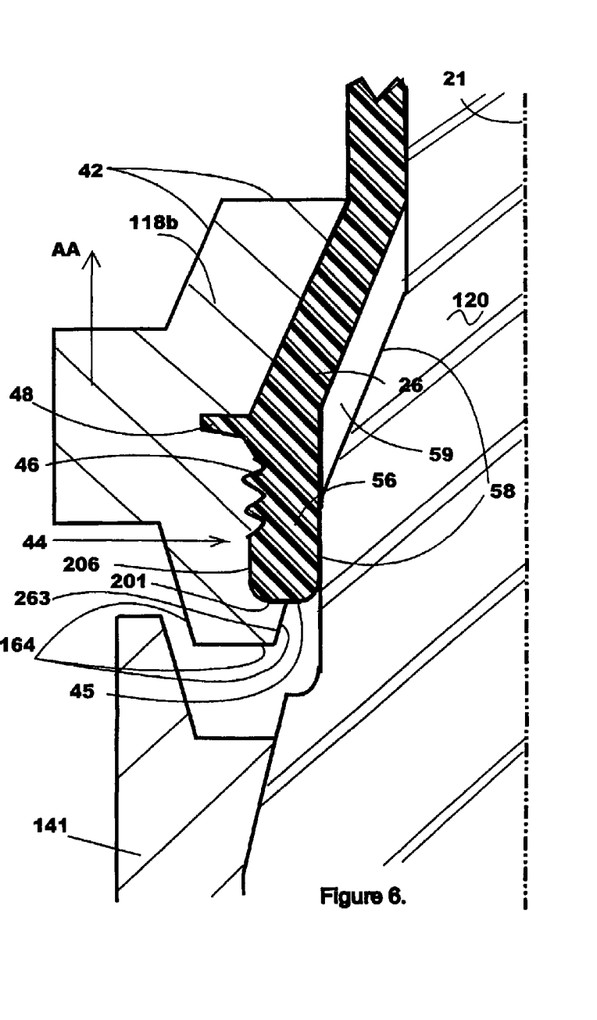
FIG. 6 is a partial cross-sectional view of components shown in FIG. 5 with the preform partially removed and without the typical neck-finish distortion.

FIG. 6 is a partial cross-sectional view similar to FIG. 5. The neck-ring 118*b* has initially moved in direction of arrow AA parallel to the axis 21 to begin removal of the preform 26 from the core component 120. The neck-ring 118*b* (and 118*a*, not illustrated in FIG. 6) has separated from the core holder 141 along a reconfigured sub-parting line 164. Furthermore, the preform 26 has partially separated 59 from the core surface 58.

The benefit of including the lifting portion 201 is clearly shown when the stripping action takes place, as illustrated in FIG. 6. The neck ring lifting portion 201 pushes directly on that part of the preform which is closest to the core where shrinkage causes the preform to resist stripping.

The ejecting force exerted by the lifting portion 201 on the preform neck finish is a combination of a shear force (originating from the sealing surface, threaded portion, and support ledge surfaces) and a compression force (originating from the top surface 21). This latter force is applied through the solidified skin portion of the preform at 21 and therefore can transmit its effect to cause stripping of the preform as soon as that skin portion is sufficiently solidified. This solidification occurs sooner in the molding cycle than the solidification of the core portion 18 since the top sealing surface is in direct contact with the respective cooled mold components, the core 10, and the neck ring 20. In contrast, the core portion 18 must wait for the conduction of its heat through the surrounding plastic to reach those cooled molding surfaces before solidification is effected. Consequently, defect-free stripping of the preform can be commenced earlier in the molding cycle. Savings of from 2 to 5 seconds in cycle time may achieved, depending on preform mold design configuration.

The relative dimensions of the lifting portion 201 will depend upon the dimensions of the particular preform being cooled, the preform molding temperature, the mold cooling apparatus, etc. Further, the lifting portion 201 may be a flat surface or a surface having grooves, pads, or other patterns therein configured to assist in cooling/lifting the preform. The lifting portion 201 may be made of the same metal as the neck ring, of a different metal, or of a plastic, designed to rapidly cool and securely lift the preform sealing surface.

Thus, the preform 26 removal or ejection forces, acting through reconfigured neck-ring 118*b* (and 118*a*, not illustrated in FIG. 6), bear not only on the threaded portion 46 and the handling ring portion 48 of the neck-finish 44 but also on the sealing surface portion 45 of the neck-finish 44. The force now bearing against the sealing surface portion 45 places some of the polymer within the neck-finish 44 in compression. Furthermore, being in direct contact with mold components, the material that will be in compression is more likely to have solidified first, thus it is better equipped to overcome the resistance created by the grip of the preform 26 against the reconfigured core component 120.

By allowing forces to bear on the sealing surface portion 45 lessens the need for removal forces to transmit entirely through the wall thickness 56 where some of the polymer may not have completely solidified. Accordingly, wall thickness 56 no longer needs to be as rigid to overcome friction created by the grip of the preform 26 against the core surface 58 thus allowing an earlier removal of preform 26 from reconfigured mold assembly 100 without risk of distortions or deformations. Trials indicate up to a five second reduction of overall preform 26 manufacturing time.

Figure 7:
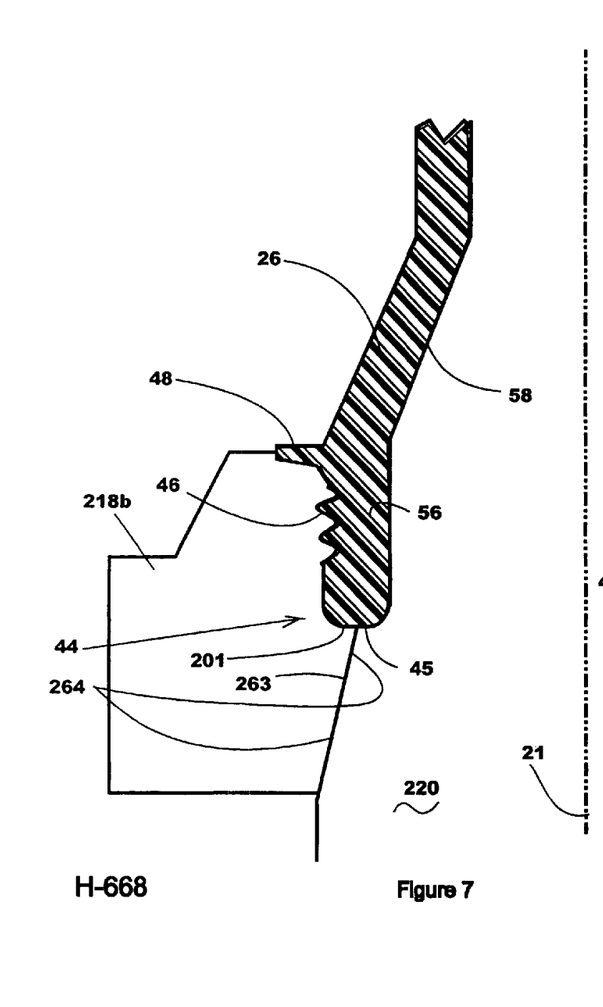
FIG. 7 is a partial cross-sectional view similar to FIG. 5 showing an alternative embodiment of the invention having a cavity-lock neck-ring configuration.

Those skilled in the art generally refer to a neck-ring arrangement as shown in FIG. 5 as a core-lock configuration. FIG. 7 illustrates an alternative cavity-lock neck-ring configuration or embodiment of the invention showing an alternative neck-ring component 218*b* (alternative neck-ring component 218*a* is not illustrated), an alternative core component 220, and an alternative core holder 241 with an alternative sub-parting line 264.

Figure 8:
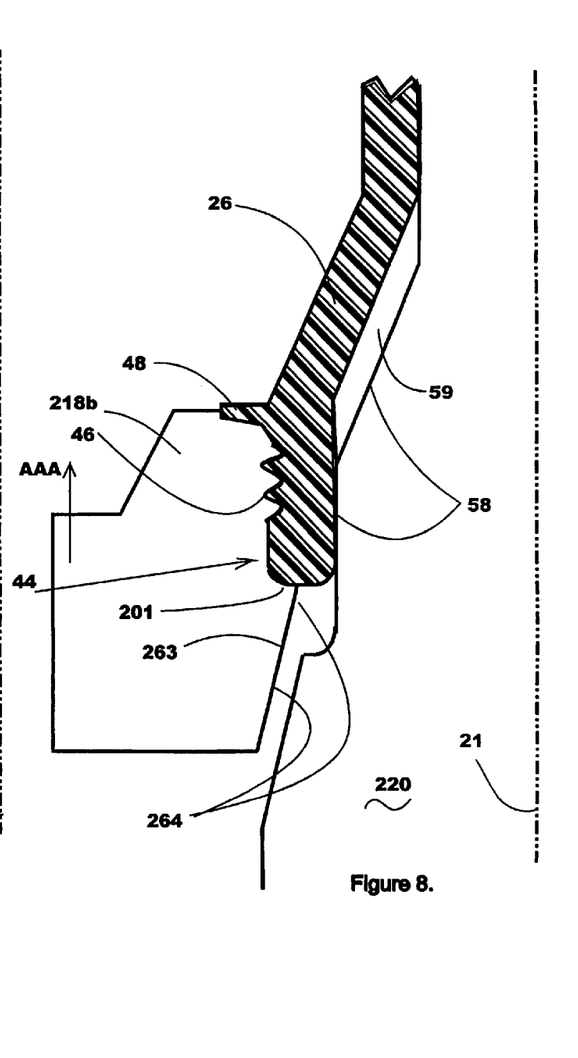
FIG. 8 is a partial cross-sectional view of similar to FIG. 6 showing the alternative embodiment with the cavity-lock neck-ring configuration and with the preform partially removed and without the typical neck-finish distortion.

FIG. 8 is a partial cross-sectional view similar to FIG. 7. Alternative neck-ring 218*b* has initially moved in direction "AAA" parallel to axis 21 to begin removal of preform 26 from alternative core component 220. Alternative neck-ring 218*b* (and 218*a*, not illustrated in FIG. 8) has separated from alternative core holder 241 and alternative core component 220 along alternative sub-parting line 264. The alternative sub-parting line 264 ends on the sealing surface portion 45 in a similar circumjacent fashion as reconfigured sub-parting line 164.

Preform 26 removal or ejection forces, acting through alternative neck-ring 218*b* (and 218*a*, not illustrated in FIG. 8) of this cavity-lock neck-ring configuration, bear not only on the threaded portion 46 and handling ring portion 48 of the neck-finish 44 but also on the sealing surface portion 45 of neck-finish 44 in a similar fashion as the core-lock configuration.

Figure 9:
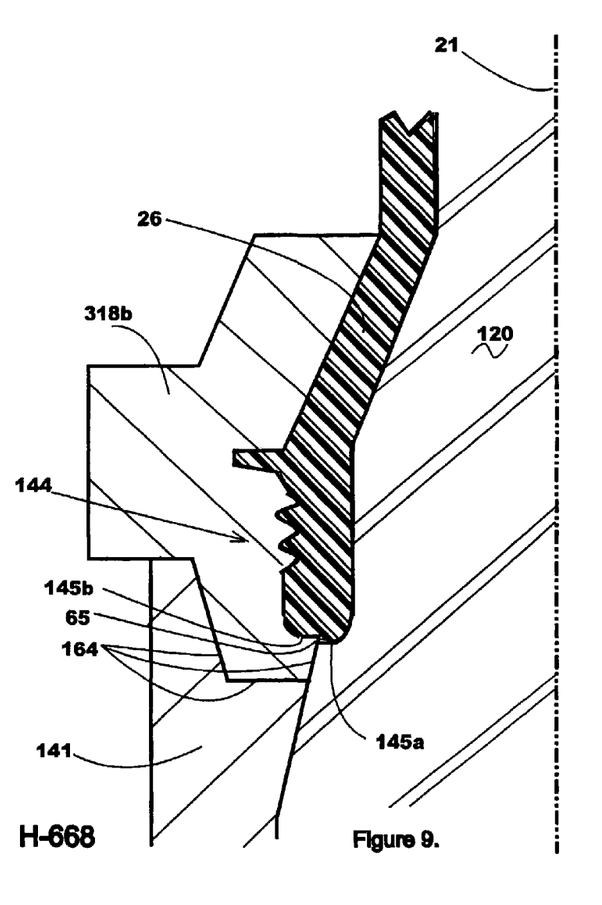
FIG. 9 is a partial cross-sectional view similar to FIG. 5 showing an alternative embodiment with a step configuration along the sealing surface of the preform.

FIG. 9 is a partial cross-sectional view illustrating another embodiment that creates a slightly modified neck-finish 144 on preform 26 having a sealing surface step 65 in profile and circumjacent with modified neck-finish 144 that corresponds with the end of reconfigured parting line 164. The circumjacent sealing surface step 65 establishes a slightly modified sealing surface portion with two elevations, dominant sealing surface 145*a* and subordinate sealing surface 145*b* having a difference in elevation in a direction parallel to axis 21 of approximately 0.001 to 0.005 inch, more preferably 0.001 to 0.002 inch (0.025 to 0.050 mm). Dominant sealing surface 145a is first in contact with the closure (not illustrated) while attaching the closure.

3. The Process

In operation, the molten plastic is injected into the mold, and the preform is formed between the core and the cavity wall. Thereafter, in order to eject the preform from the core, the neck ring is lifted in the direction of arrow AA. As is clear in FIGS. 5-8, the lifting portion 201 contacts the top sealing surface and lifts the preform away from the core. Preferably, the interior of the preform is not yet solidified, although the skin of the preform top surface is preferably solid at this point.

The present embodiment is advantageous in that it has multiple side acting inserts (neck rings) that remain closed (like a contiguous ring) to eject (strip) the part from the core by pushing on its end (sealing surface). But, later in the ejector stroke, the neck rings move sideways to clear the external protruding features (thread and support ledge) near the END of the ejector stroke. This side action is caused by cams acting on rollers mounted to the end of the ejector bars (not shown) on which the neck rings are mounted. Therefore, the present embodiment pushes against the end of the part during the majority (50-90%) of the ejector stroke.

Once separated from the core, the preform may be moved to a post mold cooling station, or the preform may be ejected into a shipping container. Since the preform is stripped from the core by a force operating primarily on the top sealing surface instead of the threads, the interior portion of the preform does not have to be completely solidified, allowing earlier stripping and a reduction in cycle times of from 2 second to 5 seconds.

4. Advantageous Features

Advantageous features according to the preferred embodiments include:

A preform mold neck ring molding surface configuration that includes part of the top surface of the preform molding surface.

A preform mold neck ring configuration that can impart a stripping action force to a preform surface that is perpendicular to the direction of said stripping action force.

5. Conclusion

Thus, what has been described is a method and apparatus for efficiently ejecting molded plastic preforms from the core, achieving reduced cycle time and cost.

While the present invention shortens the manufacturing time of blow molded container preforms generally having circular cross-sectional shapes perpendicular to its axis, those skilled in the art will realize the invention is equally applicable to other molded products possibly with non-circular cross-sectional shapes, such as, pails, paint cans, tote boxes, and other similar products requiring a similar general configuration and mold design characteristics as with the preform injection mold.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above are hereby incorporated by reference into the Detailed Description of the Preferred Embodiment.

What is claimed is:

1. Apparatus for ejecting a molded plastic article from a molding structure, comprising:
    a neck ring lifting structure having:
        a first portion configured to contact a threaded neck portion of a molded plastic article,
        a second portion configured to contact an end of the molded plastic article along a line substantially perpendicular to the lifting direction, said second portion being configured so as to not contact an inner circumferential portion of the end of the molded plastic article; and
        a third portion disposed on an opposite side of said second portion from said first portion, said third portion and said second portion having a parting line therebetween substantially parallel to the lifting direction, said third portion being stepped from said second portion in a direction substantially parallel to the lifting direction.

2. Apparatus according to claim 1, wherein the plastic article comprises a preform mounted on a mold core.

3. Apparatus according to claim 2, wherein the preform has a neck portion having a ledge, a helical thread, and a circular sealing surface, said circular sealing surface having a circular engagement portion substantially perpendicular to the lifting direction, and wherein said lifting structure second portion is configured to engage substantially fifty percent of the circular engagement portion.

4. Apparatus according to claim 3, wherein said lifting structure has portions which respectively engage the preform neck portion ledge and the preform neck portion threads.

5. Apparatus according to claim 1, further comprising moving structure for moving said lifting structure in the lifting direction.

6. Apparatus according to claim 1, wherein said lifting structure first portion applies a shear force to the molded plastic article in the lifting direction, and wherein said lifting structure second portion applies a compressive force to the molded plastic article in the lifting direction.

7. Structure to eject a molded preform from a mold device, comprising:
    a neck ring lifting portion which is configured to (i) grip a threaded neck portion of the molded preform, and (ii) contact substantially one half of a sealing surface of the molded preform and apply a compressive force thereto;
    a neck ring sealing portion having a surface disposed below said neck ring lifting portion, said surface being disposed at an angle of substantially ninety degrees with respect to said neck ring lifting portion; and
    a movement device which causes relative movement between said lifting portion and the mold device to eject the molded preform from the mold device, said movement device causing said lifting portion to remain in contact with the end of the molded preform through a majority of an opening stroke.

8. Structure according to claim 7, wherein said movement device causes the relative movement before the molded preform is solidified.

9. Structure according to claim 8, wherein said movement device causes the relative movement after a skin portion at said end of the molded preform is solidified.

10. Structure according to claim 8, wherein said lifting portion includes:
   a threaded portion configured to engage a helical thread in the molded preform neck;
   a cylindrical portion configured to contact a surface of the molded preform which is substantially parallel with a direction of lifting; and
   an end portion configured to contact a surface of the molded preform which is substantially perpendicular to the direction of lifting.

11. Structure according to claim 10, wherein said end portion applies compressive force to the molded preform, and wherein said threaded portion applies both compressive force and shear force to the molded preform.

12. Structure according to claim 7, wherein said lifting portion is disposed in a neck ring.

13. Structure according to claim 7, wherein said lifting portion applies both a shear force and the compressive force to the molded preform.

14. An injection molding machine, comprising:
   a mold cavity configured to receive a molten material and form it into a molded preform;
   a mold core configured to engage the molded preform; and
   neck ring ejecting structure configured to eject the molded preform from said mold core by applying a compressive force to an end of the molded preform, said neck ring structure being configured to (i) grip a helical threaded portion in a neck area of the molded preform, and (ii) contact substantially one half of an outer circumferential portion of a sealing portion of the molded preform throughout a majority of an opening stroke, said neck ring ejecting structure having (i) a lifting surface substantially perpendicular to a lifting direction, and (ii) a sealing surface disposed substantially parallel to the lifting direction, said neck ring lifting surface and said mold core being configured to provide a preform dominant sealing surface and a preform subordinate sealing surface that are stepped with respect to each other in the lifting direction.

15. A method for ejecting a molded plastic preform from a molding structure, comprising the steps of:
   engaging a threaded portion on a circular neck portion of the molded plastic preform;
   contacting substantially fifty percent of an end portion of a circular neck portion of the molded plastic preform with a lifting surface disposed substantially perpendicular to the ejecting direction so as to form a stepped sealing surface on an open end of the preform; and
   applying a compressive force to the end portion of the neck portion of the molded plastic preform throughout a majority of an opening stroke to eject the molded plastic preform from the molding structure.

16. A method according to claim 15, wherein the contacting step and the applying step are performed by a neck ring.

17. A method according to claim 16, wherein the neck ring also applies a shear force to the molded plastic preform during the applying step.

18. A method according to claim 15, wherein the contacting step comprises the step of contacting a tapered portion of a mold core with a tapered surface that forms an acute angle with respect to the lifting surface.

19. A method according to claim 15, wherein the applying step comprises the step of applying the compressive force while an interior portion of the molded plastic preform is nonsolid.

20. A method according to claim 15, wherein the contacting at least fifty percent step comprises the step of contacting at least fifty percent of an outer circumferential portion of a circular portion of the open end of the preform.

* * * * *